Oct. 16, 1923.
J. V. DE WALD
1,470,916
WATER LEVEL INDICATOR
Filed Jan. 23, 1923  2 Sheets-Sheet 1
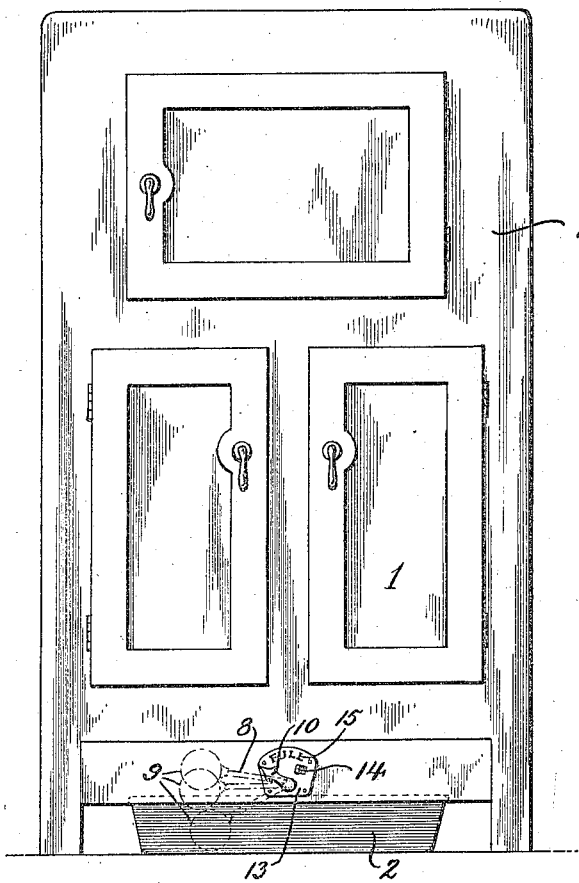
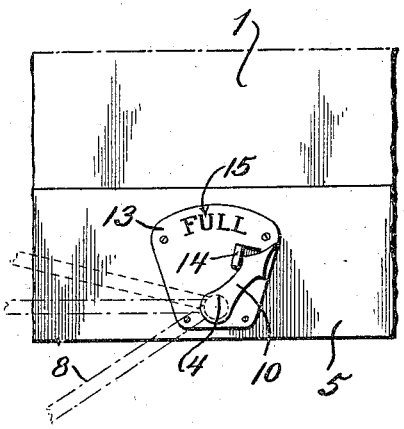
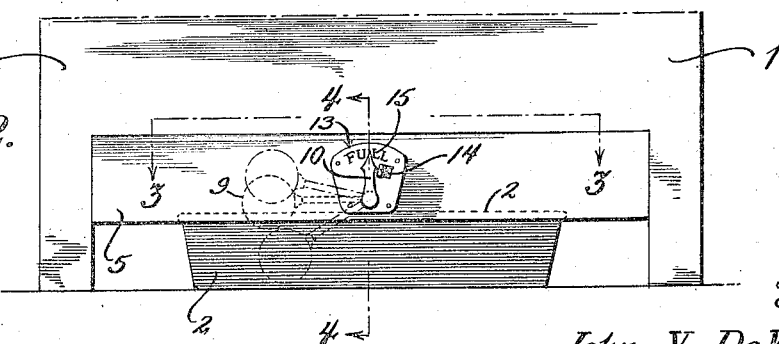
Witnesses:
Inventor
John V. DeWald
By Joshua R. H. Potts
His Attorney Oct. 16, 1923.  
J. V. DE WALD  
WATER LEVEL INDICATOR  
Filed Jan. 23, 1923  
1,470,916  
2 Sheets-Sheet 2

Inventor  
John V. DeWald

Witnesses:

By Joshua R. H. Potts  
His Attorney

Patented Oct. 16, 1923.

1,470,916

UNITED STATES PATENT OFFICE.

JOHN VINCENT DE WALD, OF PHILADELPHIA, PENNSYLVANIA.

WATER-LEVEL INDICATOR.

Application filed January 23, 1923. Serial No. 614,365.

*To all whom it may concern:*

Be it known that I, JOHN V. DE WALD, a citizen of the United States, residing at Philadelphia, in the county of Philadelphia and State of Pennsylvania, have invented certain new and useful Improvements in Water-Level Indicators, of which the following is a specification.

My invention relates to water level indicators, more particularly of a type which may be used on a refrigerator to indicate the water level in the drip pan. The object is to provide a device of a simple and novel construction which will indicate when the drip pan is full of water and means for holding the device out of the drip pan when removing it from under the refrigerator.

This object, and other advantageous ends which will be described hereinafter, I attain in the following manner, reference being had to the accompanying drawings in which—

Figure 3:
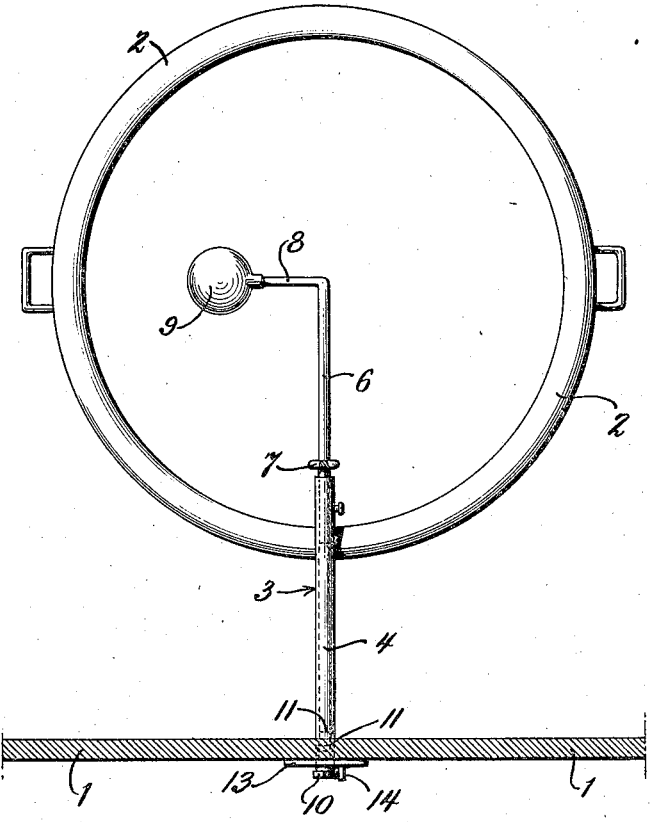
Figure 4:
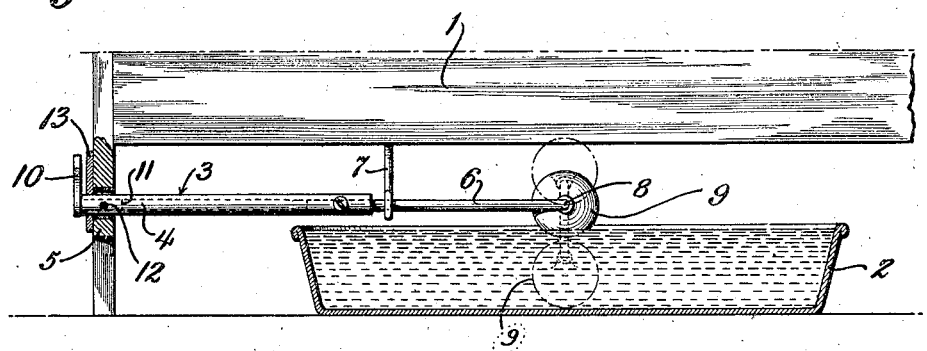

Figure 1 is a front elevation of a refrigerator having my invention applied thereto, Figure 2 a fragmentary enlarged view of the invention as shown in Figure 1 illustrating the same in another position, Figure 3 is a section on line 3—3 of Figure 2, Figure 4 a section on line 4—4 of Figure 2, and Figure 5 an enlarged fragmentary view of the indicating means illustrating the manner of holding the device out of the drip pan.

Referring to the drawings, 1 is a refrigerator of any usual construction having a drip pan 2 into which the water drips from the refrigerator drain pipe. An adjustable rock shaft 3 comprises a tube 4 rockably mounted in the front board 5 of the refrigerator and a rod 6 adjustable lengthwise within the tube and rockably mounted in an eye bolt 7 screwed into the bottom of the refrigerator. An arm 8 extends from rod 5 and has a float 9 mounted thereon. An indicator 10 has a stud 11 which fits into the tube and is secured thereto by a pin 12. A dial 13 is secured to the front board of the refrigerator by screws or other suitable means and has a projection 14 struck up from the dial. A marking 15 of any suitable description is placed on the dial to indicate the water level in the drip pan.

When the device is in use and the drip pan empty, the indicator will be in the position shown in Figure 1. As the water drips from the drain pipe of the refrigerator, the float will rise with the water level and when the pan is full cause the indicator to move into the position shown in Figure 2. When removing the full drip pan from under the refrigerator to empty it, indicator 10 is pulled outward, causing the rock shaft to slide lengthwise, until the indicator is slightly beyond projection 14 after which it is moved to the opposite side of the projection as shown in Figure 5. This action will raise the float out of the water and hold it in a raised position against the projection. The drip pan is then free of the float and ready for removal.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. The combination with a refrigerator and a drip pan, of an adjustable rock shaft mounted on the refrigerator; an arm on the rock shaft; a float on the arm; means on the rock shaft for indicating the water level in the drip pan and means adapted to engage the indicating means for holding the float out of the drip pan.

2. The combination with a refrigerator and a drip pan, of a tube rockably mounted in the refrigerator; a rod adjustably mounted in the tube; an arm on the rod; a float on the arm; means on the tube for indicating the water level in the drip pan, and means adapted to engage the indicating means for holding the float out of the drip pan.

3. The combination with a refrigerator and a drip pan, of an adjustable rock shaft mounted on the refrigerator; an arm on the rock shaft; a float on the arm; an indicator on the rock shaft; a dial on the refrigerator, and means on the dial for holding the float out of the drip pan.

4. The combination with a refrigerator and a drip pan, of an adjustable rock shaft mounted on the refrigerator; an arm on the rock shaft; a float on the arm; an indicator on the rock shaft; a dial on the refrigerator, and a projection on the dial for holding the float out of the drip pan.

5. The combination with a refrigerator and a drip pan, of a tube rockably mounted in the refrigerator; a rod adjustably mounted in the tube; an arm on the rod; a float on the arm; an indicator secured to the tube; a dial secured to the refrigerator, and means on the dial adapted to engage the indicator for holding the float out of the drip pan.

In testimony whereof I have signed my name to this specification in the presence of two subscribing witnesses.

JOHN VINCENT DE WALD.

Witnesses:
 CHAS. E. POTTS,
 ELIZABETH GARBE.